United States Patent [19]

Neuman

[11] Patent Number: 5,062,952
[45] Date of Patent: Nov. 5, 1991

[54] INJECTION MOLDING FILTER

[75] Inventor: Clayton L. Neuman, Coon Rapids, Minn.

[73] Assignee: A-1 Engineering, Inc., Coon Rapids, Minn.

[21] Appl. No.: 463,906

[22] Filed: Jan. 10, 1990

Related U.S. Application Data

[63] Continuation of Ser. No. 214,866, Jul. 1, 1988, abandoned, which is a continuation of Ser. No. 895,836, Aug. 12, 1986, abandoned.

[51] Int. Cl.$^5$ ............................................. B01D 29/11
[52] U.S. Cl. ................................... 210/232; 210/446; 210/447; 210/448; 425/197
[58] Field of Search ............... 210/232, 251, 418, 441, 210/446, 447, 448, 451, 452, 456, 497.01, 541, 542, D17; 264/37; 118/603, 610; 425/197, 198, 199

[56] References Cited

U.S. PATENT DOCUMENTS

| | | | |
|---|---|---|---|
| 2,607,954 | 8/1952 | Schneider et al. | 210/446 |
| 3,737,506 | 6/1973 | Martin et al. | 425/198 |
| 3,767,056 | 10/1973 | Neuman | 210/418 |
| 4,204,961 | 5/1980 | Cusata, Jr. | 210/251 |
| 4,217,083 | 8/1980 | Machuque | 425/198 |
| 4,434,053 | 2/1984 | Osuna-Diaz | 210/446 |
| 4,477,352 | 10/1984 | Pappas | 210/448 |
| 4,597,870 | 7/1986 | Lambertus | 210/418 |
| 4,627,916 | 12/1986 | Dörsam | 210/418 |

Primary Examiner—Robert A. Dawson
Assistant Examiner—Wanda L. Millard
Attorney, Agent, or Firm—Merchant, Gould, Smith, Edell, Welter & Schmidt

[57] ABSTRACT

Apparatus is disclosed for filtering melted plastic used in an injection molding system. The apparatus consists of a housing having an inlet and outlet with a cylindrical inner chamber disposed in alignment therebetween, and a tubular filter element threadably mounted in the internal housing. To avoid loosening of the filter element, a plurality of spiral surfaces are formed in the filter element that are exposed to the pressurized flow of melted plastic, generating a resultant force that tends to screw the filter element tighter onto its threaded mount. The threaded mount is at the inlet end of the tubular element, causing it to extend in cantilever fashion axially into the internal chamber and toward the outlet. This creates an annular discharge passage around the filter element that is unobstructed, permitting the filtered plastic to converge smoothly into the outlet.

13 Claims, 2 Drawing Sheets

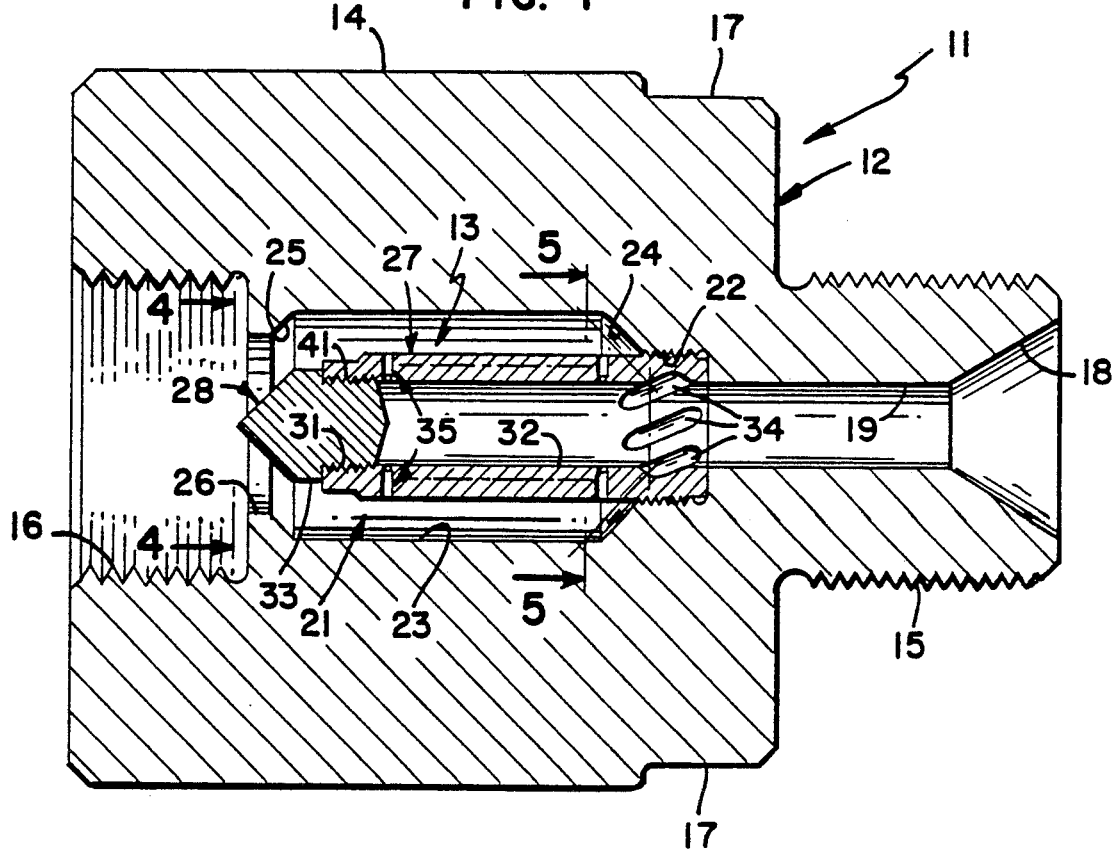
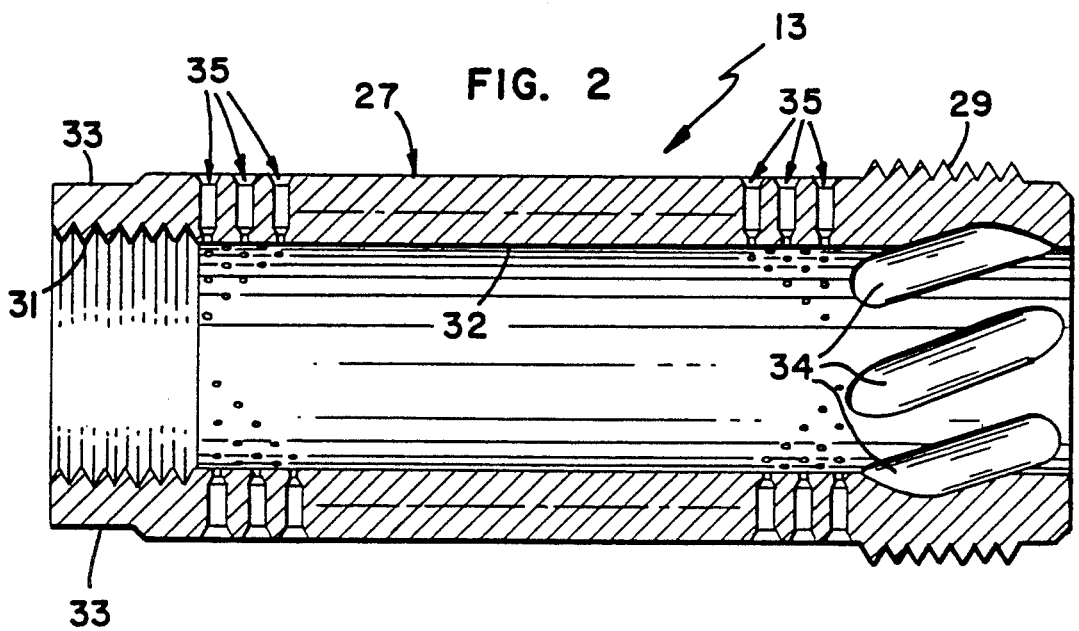

INJECTION MOLDING FILTER

This is a continuation, of application Ser. No. 07/214,866, filed July 1, 1988, which is a continuation of application Ser. No. 895,836, filed Aug. 12, 1986, both of which are abandoned.

The invention broadly relates to filtering apparatus, and is specifically directed to an improved apparatus for filtering a flow of melted plastic to be used in an injection molding system.

Plastic injection molding systems require a smooth flow of filtered plastic in order to produce articles of optimum quality. Filtering devices for the hot plastic melt are well known in the prior art, and all are subjected to extreme environmental conditions due to the viscosity of the plastic, the elevated temperature at which it must operate to maintain the plastic in a proper melted flow, and the extreme pressures necessary to inject the plastic into the mold.

A typical temperature range is 350° F.-750° F.; operating pressures can reach and exceed 30,000 psi. Filtering deices for injection molding systems must therefore be formed from materials capable of withstanding such elevated temperatures and extremely high pressures. An exemplary injection molding filter is disclosed in U.S. Pat. No. 3,767,056, which issued on Oct. 23, 1973 in the name of Gordon E. Neuman, which is assigned to the same assignee as this invention. The patent discloses a filter consisting of a housing having a cylindrical internal chamber alignably disposed between an axial inlet and outlet. A tubular filter element is mounted at each end to the housing, which includes a plurality of radially extending filter openings in its tubular side wall. The diameter of the filter element is smaller than the diameter of the internal chamber, thus defining an annular discharge passage for the filtered plastic. A rotatable valve member projects transversely through the filter element at its outlet end. In its closed position, it blocks the end of the filter element, forcing the unfiltered plastic through the filter openings for discharge through the annular passage and outlet. In the open position, the valve permits plastic to flow through the inlet, tubular filter element, valve opening and directly through the outlet for purging purposes.

The injection molding filter of U.S. Pat. No. 3,767,056 provides excellent plastic filtering results. However, the purge valve, which necessarily traverses the annular discharge chamber as well as the filter element, acts as an obstruction to output flow. Further, removal of the filter element for maintenance or replacement requires the removal of several components.

The plastic filter device of this invention is the result of an endeavor to improve the apparatus of U.S. Pat. No. 3,767,056. It also incudes a housing with a cylindrical internal chamber alignably disposed between an axial inlet and outlet. A tubular filter element including a plurality of radially extending filter openings is threadably mounted only at its inlet end to the housing in surrounding relation to the inlet, and projects axially toward the outlet in cantilever fashion. An annular discharge passage is defined between the outside diameter of the tubular filter element and inside diameter of the internal chamber.

A threaded plug closes the outlet end of the tubular element, forcing melted plastic radially outward through the filter openings into the annular discharge passage. The length of the filter element is such that the filtered fluid may converge from the annular discharge passage around the end of the tubular filter element and into the outlet. The threaded plug tapers to a point to facilitate this smooth, continuous flow.

Because the tubular filter element is mounted only at its inlet end in a threaded manner, it is possible for the flow of melted plastic operating under extremely high pressure to produce torsional forces that tend to unscrew and loosen the filter element from its threaded mount. To avoid this, the filter element is provided with a plurality of spiral surfaces extending in a direction so that, when exposed to the flow of plastic, a resultant force is created that tends to tighten the tubular filter element into its threaded mount. These spiral surfaces are preferably formed in the inner cylindrical surface of the tubular filter element at its inlet end and on the tapered surface of the threaded plug at the outlet end.

The improved structure defines a flow path for the plastic that is unobstructed in all respects with the exception of the filter openings themselves. The filter openings are advantageously constructed to permit the placement of a substantial number of openings without weakening the filter element. The element itself can be easily removed from the outlet end of the housing for maintenance or replacement, but due to the spiral surfaces, it will not loosen during operation of the system.

Additional structural advantages and features of the improved plastic filtering apparatus will become apparent from the specification and attached drawings.

BRIEF DESCRIPTION OF THE DRAWINGS

FIG. 1 is a sectional view in side elevation of filtering apparatus embodying the invention;

FIG. 2 is an enlarged sectional view in side elevation of a filter element for the filtering apparatus;

DESCRIPTION OF THE PREFERRED EMBODIMENT

Figure 3:
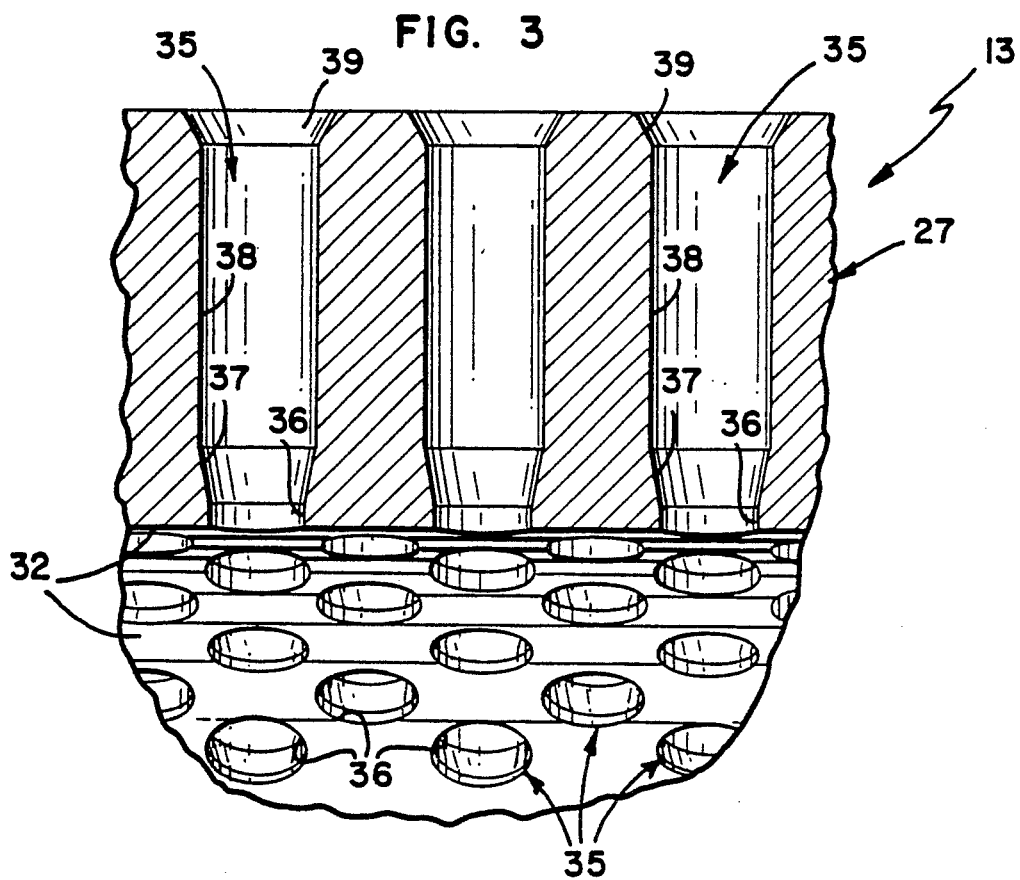
FIG. 3 is a further enlarged fragmentary sectional view of the filter element, showing in particular the structural detail of the filtration openings.

With initial reference to FIG. 1, an improved filtering device for use in high pressure plastic injection molding apparatus is represented generally by the numeral 11. Device 11 broadly comprises a housing bearing the general reference numeral 12 and a filter element bearing the general reference numeral 13.

Housing 12 in the preferred embodiment comprises a steel member having a cylindrical outer surface 14 with an axially extending threaded projection 15 at one end and a threaded recess 16 at the axially opposite end. The threaded projection 15 and threaded recess 16 permit the filter 11 to be mounted in line within a plastic injection molding system. To facilitate such mounting, a plurality of flats 17 are formed on the external surface of the housing 12, permitting it to be wrenched into place.

Housing 12 is formed with a number of axial bores of different size, length and configuration that together define a flow path for the melted plastic. A flared or tapered bore 18 extending axially inward from the end of threaded projection 15 defines an inlet for the filter device 11. This leads to a smaller straight circular inlet bore 19 that leads to an internal chamber bearing the general reference numeral 21. At one end of the internal chamber 21 is a threaded bore 22 that is larger in diameter than the straight bore 19. The internal chamber 21 is primarily defined by a large circular bore 23 that is further defined at each end by 45° steps 24, 25. A short circular bore 26 establishes communication between the internal chamber 21 and the threaded recess 16, the latter of which also serves as an outlet for the filter device 11.

In the preferred embodiment, the bores 18, 19, 23-26 and threaded recess 16 are formed on the axis of the cylindrical housing 12 and establish a predetermined flow of melted plastic therethrough.

With continued reference to FIG. 1 and additional reference to FIG. 2, filter element 13 broadly comprises a tubular member bearing the general reference numeral 27, which has an open inlet end and an outlet end closed by an end plug (FIG. 1 only) bearing the general reference numeral 28, and which is described in further detail below.

Tubular member 27 is preferably of circular cross section with an annular wall of predetermined thickness. The inlet end of tubular member 27 is formed with an external threaded portion 29 that mates with the threaded bore 22 in surrounding relation to the inlet bore 19. A threaded recess 31 at the outlet end of tubular member 27 is adapted to receive the end plug 28.

The axial length of the filter element 13, including both the tubular member 27 and end plug 28 occupies the entirety of the internal chamber 21, projecting just into the threaded recess 16. The outside diameter of tubular member 27 is less than the diameter of bore 23, leaving an annular passage therebetween to accommodate the flow of melted plastic after it has passed through the filter element.

Tubular member 27 has an internal bore 32 that is continuous over its length from the inlet to the threaded outlet, and which corresponds dimensionally to the inlet bore 19 in housing 12. This permits the unfiltered melted plastic to flow smoothly through the inlet bore 19 into the filter element 13.

Tubular member 27 further comprises a plurality of external flats 33 at the outlet end that together define a hexagonal surface (see also FIG. 4) permitting the tubular member 27 to be wrench tightened when it is screwed into the threaded bore 22.

Figure 5:
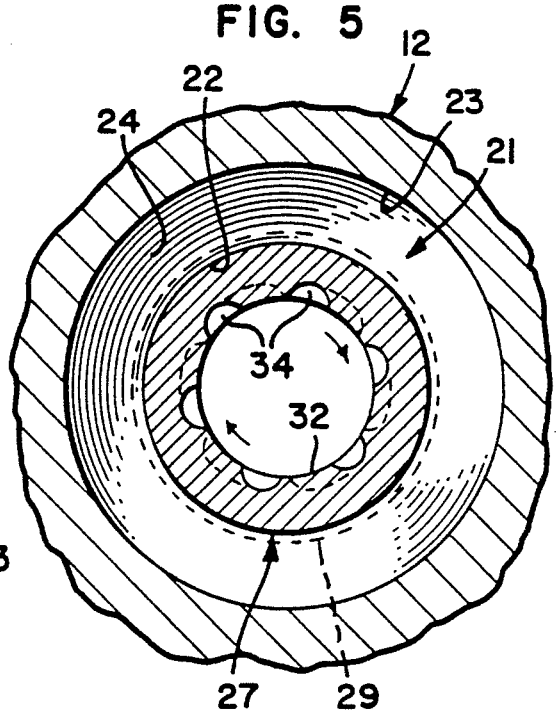
FIG. 5 is an enlarged fragmentary end sectional view of the filter element taken along the line 5—5 of FIG. 1.

The threads of the threaded bore 22 and external threaded portion 29 are formed with a conventional righthand thread in the preferred embodiment; i.e., when viewed from its outlet end, tubular member 27 is screwed into place with clockwise rotation. To insure that the filter element 13 is maintained in this threaded mounting position, a number of spiral surfaces 34 are formed in the inner cylindrical surface of bore 32 at the inlet end of tubular member 27; i.e., in the region of the threaded portion 29. In the preferred embodiment, and as additionally shown in FIG. 5, the spiral surfaces 34 specifically take the form of grooves with rounded bottoms extending in a clockwise direction when viewed along the axis of tubular member 27. The essential function of spiral surfaces 34 is to present to the flow of melted plastic surfaces that are not parallel to the established direction of plastic flow (which is axial in this region), and to generate as the result of the plastic flowing against this surface a force that maintains the filter element 13 in its threaded mounting position. More specifically, when the flow of melted plastic under extremely high pressure engages these spiral surfaces 34, the fact that the surfaces 34 are angularly disposed relative to the line of plastic flow creates a force at any given point having a force component that tends to move the tubular member 27 in a clockwise direction, which tends to tighten the member 27 in place.

The direction in which the spiral surfaces 34 extend obviously is chosen based on the thread direction of the threaded bore 22 and external threaded portion 29 to produce forces that screw the tubular element 27 into its mounting position.

With continued reference to FIGS. 2 and 3, a plurality of filtration openings formed through the annular wall of tubular member 27 are represented by the general reference numeral 35. In the preferred embodiment, the filtration openings are formed in rows that extend both axially and circumferentially, and as best shown in FIG. 3, the openings 35 are staggered or offset in alternate rows to produce a uniform pattern extending over a substantial portion of the length of the tubular member 27.

With specific reference to FIG. 3, each of the filtration openings 35 comprises an inlet bore 36 that opens on the internal cylindrical surface and is of predetermined size. The inlet bore 36 leads to an angularly stepped diverging bore 37 of increasing size that establishes a transition to a larger straight circular bore 38. An angularly flared diverging bore 39 leads from the bore 38 to the outer surface of tubular member 27 and serves as an outlet for the filtration opening 35.

This specific construction of each of the filtration openings forms two primary functions. First, since the inlet bore 36 is smaller in size than any of the bores 37-39, any material that enters the bore 36 will leave the filtration opening 35. Stated otherwise, it is not possible for particulate matter to enter one of the filtration openings 35 and to thereafter clog the bore.

The second function of the specific construction of filtration openings 35 is to provide a sufficient number of divergent openings without significantly decreasing the mass of the filter element. For example, it is possible for a divergent filtration opening to taper outward from the inlet to the outlet, but due to the necessary taper for such construction, the size of the outlet utilizes a significant amount of the external surface and mass of the element. U.S. Pat. No. 3,767,056 discloses such filtration openings. However, by structuring the filtration opening to include a large straight bore 38 in communication with the smaller inlet 36 and larger outlet 39, a lesser external surface area is used while accomplishing the desired function of the tapered filtration opening. As a result, a lesser mass of the filter element is used with the same number of filtration openings without weakening the filter element.

Figure 4:
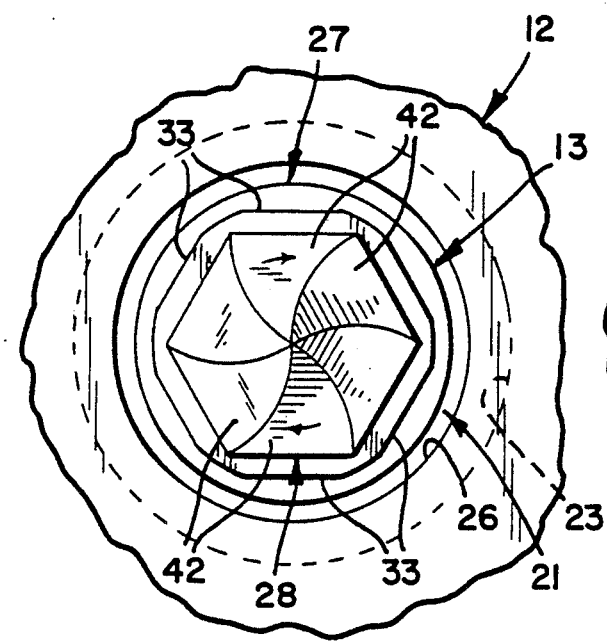
FIG. 4 is an enlarged fragmentary end view of an end plug for the filter element as seen from line 4—4 of FIG. 1.

With reference to FIGS. 1 and 4, end plug 28 comprises a rearward threaded projection 41 that mates with the threaded recess 31 and tubular member 27, and a forwardly projecting head that tapers to a point. The tapered portion is generally conical, and its angular surface is disposed in parallel relation to the stepped bore 25 to establish a nonrestrictive passage of substantially uniform size. The tapered portion of the head is formed with a plurality of spiral surfaces 42 that, although of a different configuration, perform the same function as the spiral surfaces or grooves 34. The spiral direction of the surfaces 42 is based on the thread direction of the threaded recess 31 and threaded projection 41 which, in the preferred embodiment, are also righthand threads. Accordingly, when the melted plastic surrounds the end plug 28, the spiral surfaces 42 generate a force that is clockwise as viewed in FIG. 4, as indicated by the directional arrows. This serves to maintain the end plug in tight threaded engagement with the tubular member 27, and also assists the spiral grooves 34 in maintaining the tubular member 27 in its threaded mounting position.

In operation, and with the filter device 11 mounted in line in an injection molding system, hot melted plastic enters the inlet 18 under pressure which can equal and exceed 30,000 psi. The melted plastic flows through the bore 19 and into the tubular member 27, where further forward axial movement is stopped by the end plug 28. The melted plastic is then forced radially outward through the system of filtration openings 35 and into the annular passage surrounding the filter element 13. From this annular passage, it moves forward around the end plug 28 into and out of the outlet for use in the injection mold.

In the conventional injection molding system, the supply of hot melted plastic to the mold is intermittent, since flow must stop momentarily while the mold is closed and the molded article hardens. While the plastic is moving through the filter device 11, the flow engages both the spiral surfaces 34 and 42, and as described above, forces result that tend to tighten the filter element 13 in its threaded mounted position. Thus, the intermittent supply of hot melted plastic cannot cause the filter element to unscrew or become loosened, as is possible with prior art devices.

After a period of time, the filter element 13 requires purging of the particulate matter and contaminants that cannot pass into and through the filter openings 35. This is easily accomplished, by first removing the end plug 28 from threaded bore 31 by access through the outlet 16. At this point, inlet plastic may be permitted to flow directly through the filter element 13 to remove the filtrate, or a rod having an outside diameter approximating the internal diameter of tubular member 27 may be introduced through the inlet 18 and inlet bore 19, which acts as a plunger to quickly remove all contaminants and particulate matter.

The specific construction of the filter device 11 is beneficial in other respects. For example, the fact that the filter element 13 is threadably mounted from its inlet end in a cantilever manner results in a flow of melted plastic that is never obstructed except by the filter element itself, thus insuring smooth, continuous flow. This is extremely important because any obstruction in the plastic flow can cause stagnation, resulting in the formation of particulate matter within the flow stream, degradation of the plastic melt and an end product of lesser quality.

It will also be observed that this smooth, continuous flow is enhanced by the annular chamber surrounding the tubular member 27 as it converges into the outlet. This is the result of the stepped bore 25 and its substantially parallel relationship with the tapered portion of end plug 28, as shown in FIG. 1.

The inventive filter device 11 thus insures a smooth, continuous flow of filtered plastic to the injection mold, and maintains the filter element 13 in a tight threaded mounting position in all phases of operation.

What is claimed is:

1. Apparatus for filtering a flow of fluid, comprising:
   a housing having an inlet of predetermined cross sectional size for receiving unfiltered fluid and an outlet of predetermined cross sectional size for discharging filtered fluid, and defining an internal chamber aligned between the inlet and outlet;
   a filter element comprising a tubular body with an annular wall of predetermined thickness, the tubular body having a first open inlet end, a second closed end and a plurality of filter openings extending through said annular wall;
   and means for mounting the open end of the tubular body to the housing with said open end in fluid communication with said inlet and aid tubular body extending in cantilever fashion toward said outlet in alignment therewith with said second closed end unengaged within said internal chamber;
   said tubular body and internal chamber being relatively sized to define a passage therebetween that is disposed in fluid communication with said outlet, and through which filtered fluid flows as it leaves the filter openings;
   and the tubular body having a cross sectional size less than that of the housing outlet, whereby access to said tubular body may be gained through said housing outlet.

2. The apparatus defined by claim 1, wherein the inlet, outlet, internal chamber and tubular body are disposed on a common axis.

3. The apparatus defined by claim 2, wherein the inlet, outlet and internal chamber cylindrical bores, and the tubular body is of circular and annular cross section.

4. The apparatus defined by claim 3, wherein the filter openings are disposed in a plurality of circumferential and axial rows.

5. The apparatus defined by claim 4, wherein the rows of filter openings are alternately staggered.

6. The apparatus defined by claim 3, wherein the mounting means comprises an externally threaded portion on the first open inlet end of said tubular body, and a threaded recess in said housing disposed in surrounding relation to said inlet.

7. The apparatus defined by claim 3, in which the internal diameter of the tubular member and the internal diameter of the housing inlet are equal.

8. The apparatus defined by claim 1, wherein each of said filter openings has an inlet bore on the inner surface of said tubular body and an outlet bore on the outer surface of said tubular body, said outlet bore being larger than said inlet bore.

9. The apparatus defined by claim 8, wherein each filter opening further comprises a straight bore disposed in coaxial alignment with said inlet and outlet bores, a diverging transition bore between the inlet and straight bores, and a diverging transition bore between the straight bore and the outlet bore.

10. Apparatus for filtering a flow of fluid, comprising:
    a housing defining an internal chamber;
    an inlet formed in the housing comprising a cylindrical bore communicating with said internal chamber, a portion of said bore adjacent said chamber being internally threaded with said threads being in a predetermined thread direction;
    an outlet comprising a cylindrical bore communicating with said internal chamber and disposed in axial alignment with said inlet;
    a filter element disposed in the internal chamber in fluid communication with the inlet for filter fluid, and in fluid communication with the outlet for discharging filtered fluid, the filter element comprising:

a tubular body of circular cross section with an annular wall of predetermined thickness and having a predetermined axis;

a first open inlet end externally threaded for threadable engagement with said threaded portion of the inlet and mountable therein with said tubular body in axial alignment with said inlet and outlet;

a second open end formed with internal threads of the same predetermined thread direction, and a threaded plug closing said second end;

a plurality of filter openings extending through said annular wall; and a plurality of spiraled grooves formed on the inner surface of the tubular body proximate said first open end, the grooves being exposed to the flow of fluid and disposed in a direction so that said flow of fluid produces a torsional force maintaining the tubular body in its threaded mounted position.

11. The apparatus defined by claim 10, wherein the threaded plug has an external surface tapering to an axial point.

12. The apparatus defined by claim 11, wherein the surface means further comprises a plurality of spiraled surfaces formed on said tapered plug surface.

13. Apparatus usable in a plastic injection molding system, comprising:

a housing having an inlet of predetermined cross sectional size for receiving unfiltered fluid and an outlet of predetermined cross section size for discharging filtered fluid, and defining an internal chamber aligned between the inlet and outlet;

a tubular body having a first open end and a second end;

aperture means formed in said tubular body for permitting the restricted flow of melted plastic through said body;

and means for mounting the first open end of the tubular body to the housing with said open end in communication with said inlet and said tubular body extending in cantilever fashion toward aid outlet in alignment therewith with said second end unengaged within said internal chamber;

said tubular body and internal chamber being relatively sized to define a passage therebetween that is disposed in communication with said outlet, and through which hot melted plastic flows at its leaves the aperture means;

and the tubular body having a cross sectional size less than that of the housing outlet, whereby access to said tubular body may be gained through said housing outlet.

* * * * *